(12) United States Patent
Farr et al.

(10) Patent No.: US 8,785,824 B1
(45) Date of Patent: Jul. 22, 2014

(54) BOILER REGULATION SYSTEM FOR ENSURING HOT WATER IS PRIORITY

(76) Inventors: Scott K. Farr, Manchester, NH (US);
Deborah L. Farr, Manchester, NH (US)

( * ) Notice: Subject to any disclaimer, the term of this patent is extended or adjusted under 35 U.S.C. 154(b) by 418 days.

(21) Appl. No.: 13/313,674

(22) Filed: Dec. 7, 2011

(51) Int. Cl.
*H05B 1/02* (2006.01)
*F24H 1/00* (2006.01)
*G05D 23/24* (2006.01)

(52) U.S. Cl.
CPC . *F24H 1/00* (2013.01); *G05D 23/24* (2013.01)
USPC ........... 219/497; 219/492; 219/494; 392/465; 392/474

(58) Field of Classification Search
None
See application file for complete search history.

(56) References Cited

U.S. PATENT DOCUMENTS

| | | | |
|---|---|---|---|
| 4,808,793 | A | 2/1989 | Hurko |
| 4,970,373 | A | 11/1990 | Lutz et al. |
| D339,434 | S | 9/1993 | Shero |
| 6,351,603 | B2 | 2/2002 | Waithe et al. |
| 6,806,446 | B1 | 10/2004 | Neale |
| 7,178,543 | B2 | 2/2007 | Adams |

*Primary Examiner* — Shawntina Fuqua

(57) ABSTRACT

A boiler regulation system for diverting energy from a boiler to hot water production having a housing with a thermostat dial, a sensor connection, and a plurality of connections on the housing; a step down transformer, a first general-purpose relay coil, a close-on-rise thermostat, and a first normally closed contact relay corresponding to a heating zone valve/pump each in the housing; wherein when the close-on-rise thermostat senses a rise in temperature when hot water is in demand the close-on-rise thermostat closes sending a first signal to the first general-purpose relay coil and the first general-purpose relay coil energizes causing the first normally closed contact relay to open, discontinuing power to the heating zone valve/pump thereby enabling boiler energy to be used for hot water.

5 Claims, 3 Drawing Sheets

(Block Diagram)

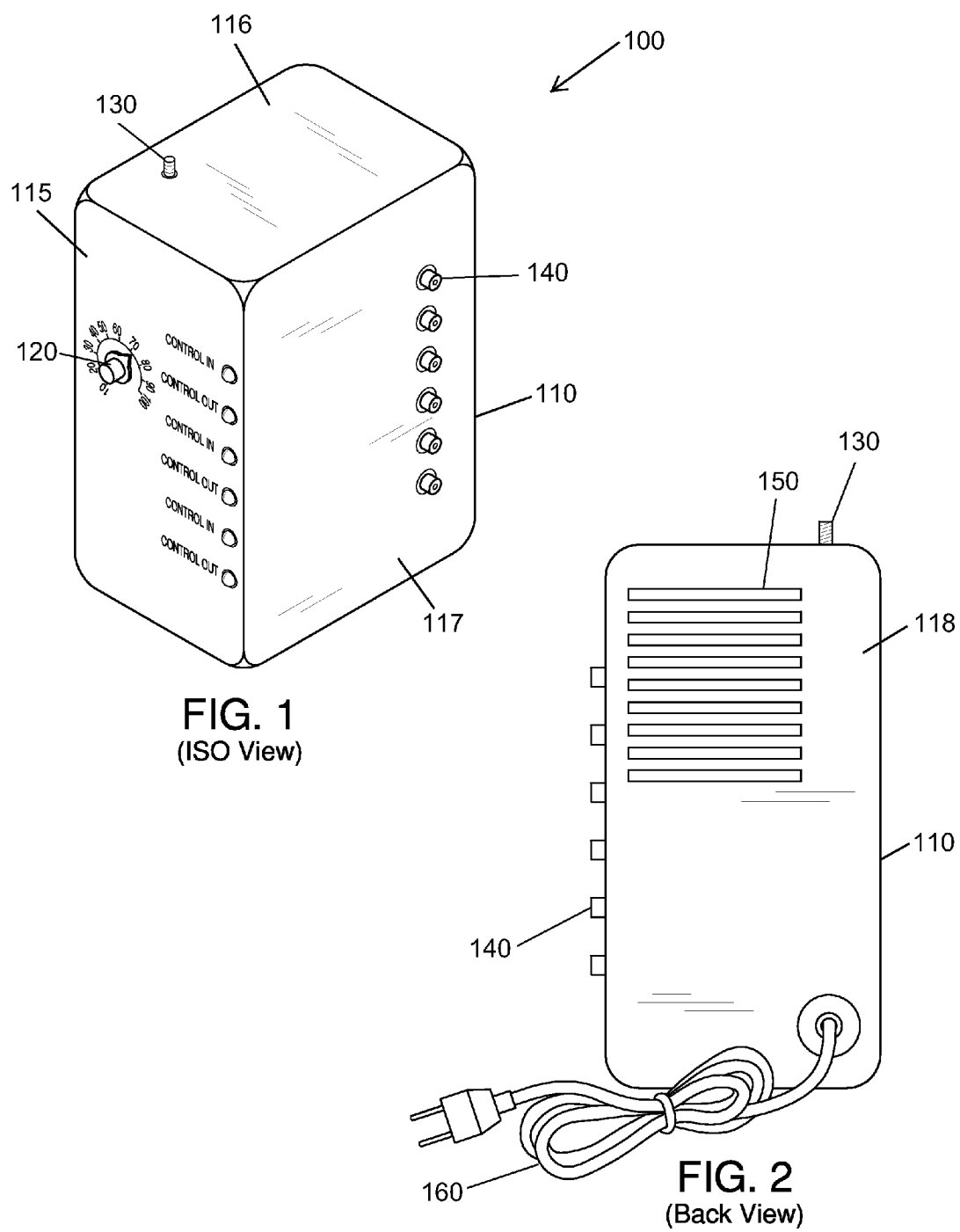

(Front View)

(Side View)

(Block Diagram)

US 8,785,824 B1

BOILER REGULATION SYSTEM FOR ENSURING HOT WATER IS PRIORITY

FIELD OF THE INVENTION

The present invention is directed to a thermostat system for diverting boiler energy to creating hot water.

BACKGROUND OF THE INVENTION

In some homes, a boiler (e.g., with a tankless water coil) us used to heat water and provide heat. The present invention is a boiler regulation system. The system of the present invention makes hot water production is a priority; the heat zones are shut down while hot water is in use. For example, the system helps ensure that hot water in a shower is maintained (e.g., does not turn cold). The system of the present invention works with a tankless water coil as well as an indirect water heating system.

SUMMARY

The present invention features a boiler regulation system for ensuring hot water is priority. In some embodiments, the boiler regulation system for diverting energy from a boiler to hot water production comprises a housing; a thermostat dial, a sensor connection, and a plurality of connections each disposed on the housing, the connections each comprise an in port and an out port wherein the in port operatively connects to the thermostat (e.g., control wiring from thermostat) and the out port operatively connects to the zone valve/pump (control wire to zone valve/pump), the sensor connection is operatively connected to a domestic hot water pipe; a step down transformer, a first general-purpose relay coil, a close-on-rise thermostat, and a first normally closed contact relay corresponding to a heating zone valve/pump each disposed in the housing; wherein when the close-on-rise thermostat senses a rise in temperature when hot water is in demand the close-on-rise thermostat closes sending a first signal to the first general-purpose relay coil and the first general-purpose relay coil energizes causing the first normally closed contact relay to open, discontinuing power to the heating zone valve/pump thereby enabling boiler energy to be used for hot water; wherein when the close-on-rise thermostat senses a drop in temperature when hot water is not in demand the close-on-rise thermostat opens and the first generally-purpose relay coil de-energizes allowing the first normally closed contact relay to close and power to resume to the heating zone valve/pump.

In some embodiments, the system further comprises a vent disposed on the housing. In some embodiments, the step down transformer is a 120 v/24 v transformer.

In some embodiments, the system further comprises a second general-purpose relay coil disposed in the housing and a second normally closed contact relay corresponding to a heating zone valve/pump disposed in the housing, when the close-on-rise thermostat senses a rise in temperature when hot water is in demand the close-on-rise thermostat closes sending a first signal to both the first general-purpose relay coil and the second general-purpose relay coil and the general-purpose relay coils energize causing both the normally closed contact relays to open, discontinuing power to both the heating zone valves/pumps thereby enabling boiler energy to be used for hot water; when the close-on-rise thermostat senses a drop in temperature when hot water is not in demand the close-on-rise thermostat opens and the generally-purpose relay coils de-energize allowing the normally closed contact relays to close and power to resume to the heating zone valves/pumps.

In some embodiments, the system further comprises an indicator light disposed on the housing, the indicator light is operatively connected to a normally open contact relay disposed in the housing, wherein when the coil is energized the coil sends a second signal to the normally open contact relay, supplying power for the indicator light and when the coil is de-energized power stops to the indicator light.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the system of the present invention.

FIG. 2 is a back view of the system of the present invention.

DESCRIPTION OF PREFERRED EMBODIMENTS

Figure 3:
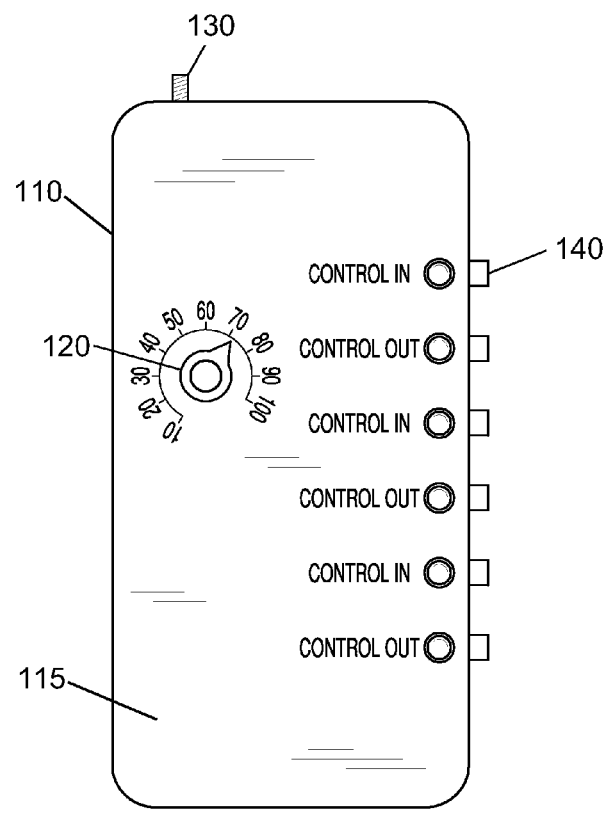
FIG. 3 is a front view of the system of the present invention.
Figure 4:
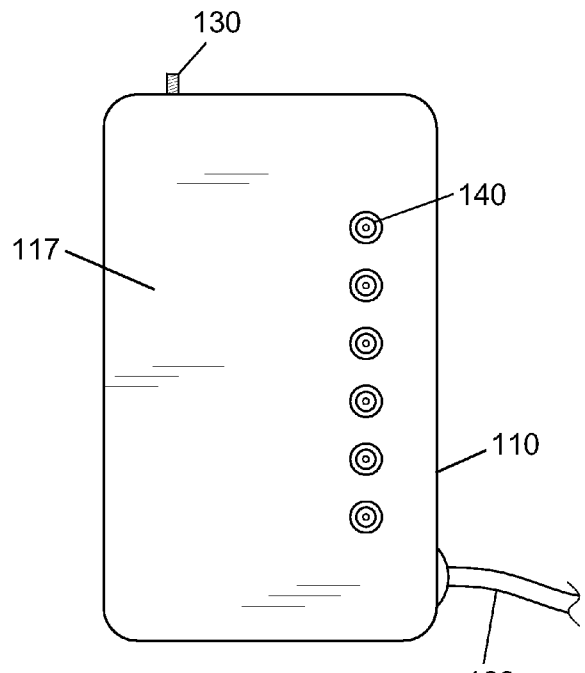
FIG. 4 is a side view of the system of the present invention.

Referring now to FIG. 1-5, the present invention features a boiler regulation system 100 for making hot water production is a priority. The system 100 comprises a housing 110 as shown in FIG. 1-4. The housing has a control surface 115 (e.g., front surface), a sensor surface 116 (e.g., a top surface), and a connection surface 117 (e.g., side surface). As shown in FIG. 1, a thermostat dial 120 is disposed on the control surface 115. A sensor connection 130 is disposed on the sensor surface 116. A plurality of connections 140 is disposed on the connection surface 117. A vent 150 is disposed on a vent surface 118 (e.g., a back surface). The arrangement of the thermostat dial 120, sensor connection 130, and connections 140 is not limited to the configuration shown in the figures. For example, the connections 140 and the sensor connection 130 may be disposed on the same surface. The system 100 further comprises a power plug 160.

The connections 140 each comprise an in port and an out port. The in port operatively connects to the thermostat (e.g., control wiring from thermostat). The out port operatively connects to the zone valve/pump (control wire to zone valve/pump). The sensor connection 130 is for operatively connecting to the domestic hot water pipe.

Figure 5:
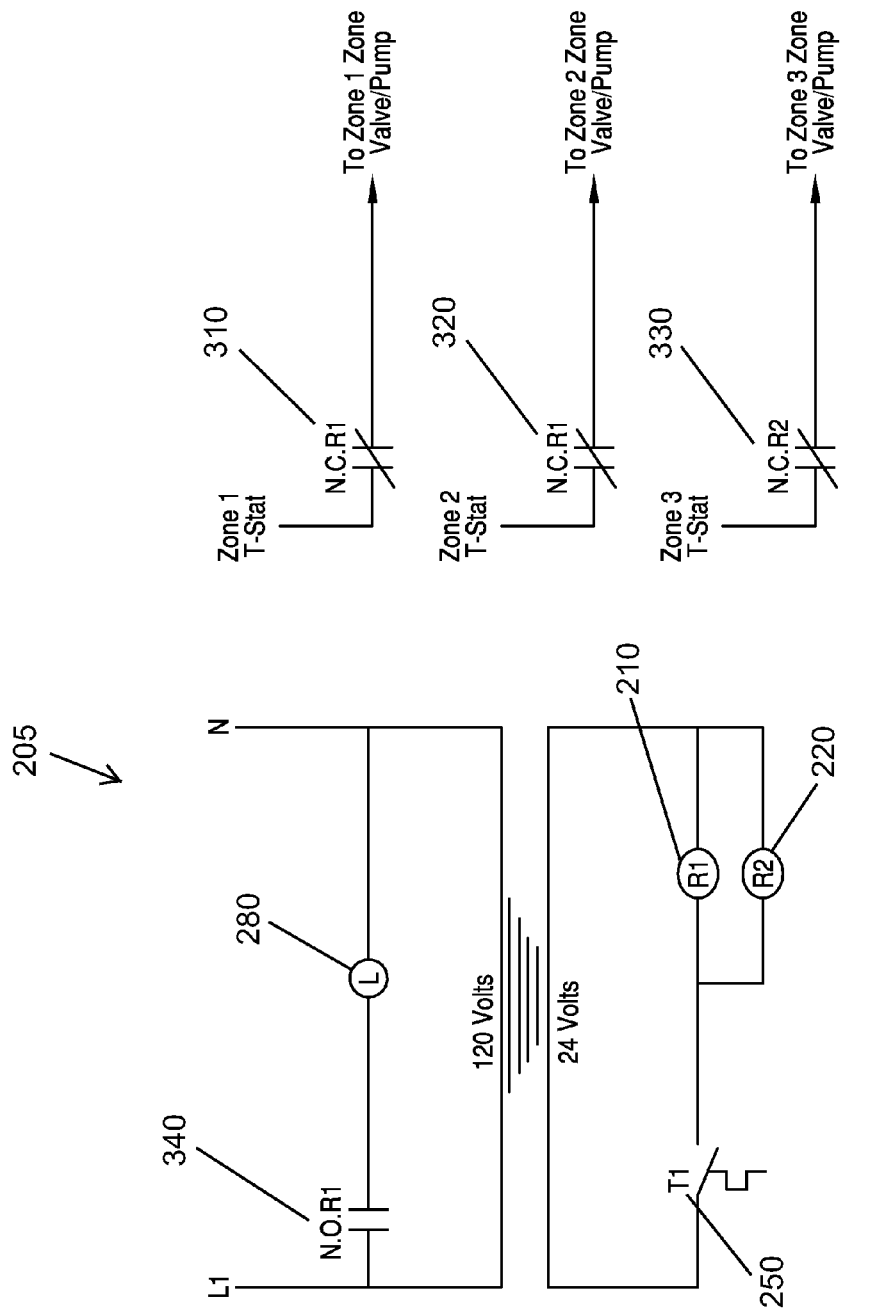
FIG. 5 is a schematic view of the electrical configuration of the system of the present invention. R1=general-purpose relay coil #1 (210). R2=general-purpose relay coil #2 (220). T1=close-on-rise thermostat (250). L=optional indicator light (280). 120 volts/24 volts=step down transformer (205). N.C. R1=normally closed contact relay #1 (310). N.C. R2=normally closed contact relay #2 (320). N.C. R3=normally closed contact relay #3 (330). N.O. R1=normally open contact relay #1 (340).

As shown in FIG. 5, a step down transformer 205 (e.g., 120 v/24 v transformer) is disposed in the housing 110. At least a first general-purpose relay coil 210 is disposed in the housing 110. In some embodiments, a first general-purpose relay coil 210 and a second general-purpose relay coil 220 are disposed in the housing 110. A close-on-rise thermostat 250 is disposed in the inner cavity of the housing 110. The close-on-rise thermostat 250 monitors hot water usage. The close-on-rise thermostat 250, the relay coils 210, 220, and the transformer 205 are operatively connected as shown in FIG. 5.

Also disposed in the housing 110 is a normally closed contact relay corresponding to each zone valve/pump. For example, in some embodiments, a first normally closed contact relay 310 is disposed in the housing 110. In some embodiments, a second normally closed contact relay 320 is disposed in the housing 110. In some embodiments, a third normally closed contact relay 330 is disposed in the housing 110.

In some embodiments the system 100 features an indicator light 280. In some embodiments, the system 100 further comprises a normally open contact relay 340. The normally open contact relay 340 is operatively connected to the indicator light 280 as shown in FIG. 5.

Upon sensing a rise in temperature (e.g., when hot water is in demand), the close-on-rise thermostat 250 closes, sending a first signal (e.g., 24 v) to general-purpose relay coils 210, 220 and the coils 210, 220 energize. This causes the normally closed contacts 310, 320, 330 carrying control voltage from each heating thermostat to open, discontinuing power to the heating zone valves/pumps. This enables all of the boiler's heating output to be used only for hot water purposes without the heat being diverted to heating elements (e.g., baseboard heaters, etc.). The heat from the boiler only heats the water being used for a shower or bath, washing dishes, etc.

In some embodiments, when the coils 210, 220 are energized upon the close of the close-on-rise thermostat 250, the coils 210, 220 send a second signal (e.g., 120 v) to the normally open contact relay 340, supplying power for the indicator light 280.

Upon sensing a drop in temperature (e.g., when hot water usage ends), the close-on-rise thermostat 250 opens. This de-energizes the general-purpose relay coils 210, 220, thereby allowing the heating thermostat control circuit to return to normal operation. In some embodiments, the de-energizing of the general-purpose relay coils 210, 220 stops power to the optional indicator light 280.

In some embodiments, the system 100 is producible with a printed circuit board rather than time delays The disclosures of the following U.S. patents are incorporated in their entirety by reference herein: U.S. Pat. No. 4,808,793; U.S. Pat. No. 4,970,373; U.S. Design Pat. No. D339,434; U.S. Pat. No. 6,351,603; U.S. Pat. No. 6,806,446; U.S. Pat. No. 7,178,543.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A boiler regulation system (100) for diverting energy from a boiler to hot water production, said boiler regulation system (100) comprising:
    (a) a housing (110);
    (b) a thermostat dial (120), a sensor connection (130), and a plurality of connections (140) each disposed on the housing (110), the connections (140) each comprise an in port and an out port wherein the in port is operatively connected a close-on-rise thermostat (250) and the out port is operatively connected to a heating zone valve/pump, the sensor connection (130) is operatively connected to a domestic hot water pipe;
    (c) a step down transformer (205), a first general-purpose relay coil (210), the close-on-rise thermostat (250), and a first normally closed contact relay (310) corresponding to a heating zone valve/pump each disposed in the housing (110);
wherein when the close-on-rise thermostat (250) senses a rise in temperature when hot water is in demand the close-on-rise thermostat (250) closes sending a first signal to the first general-purpose relay coil (210) and the first general-purpose relay coil (210) energizes causing the first normally closed contact relay (310) to open, discontinuing power to the heating zone valve/pump thereby enabling boiler energy to be used for hot water;
wherein when the close-on-rise thermostat (250) senses a drop in temperature when hot water is not in demand the close-on-rise thermostat (250) opens and the first generally-purpose relay coil (210) de-energizes allowing the first normally closed contact relay (310) to close and power to resume to the heating zone valve/pump.

2. The system (100) of claim 1 further comprising a vent (105) disposed on the housing (110).

3. The system (100) of claim 1, wherein the step down transformer (205) is a 120 v/24 v transformer.

4. The system (100) of claim 1 further comprising a second general-purpose relay coil (220) disposed in the housing (110) and a second normally closed contact relay (320) corresponding to a heating zone valve/pump disposed in the housing (110), when the close-on-rise thermostat (250) senses a rise in temperature when hot water is in demand the close-on-rise thermostat (250) closes sending a first signal to both the first general-purpose relay coil (210) and the second general-purpose relay coil (220) and the general-purpose relay coils (210, 220) energize causing both the normally closed contact relays (310, 320) to open, discontinuing power to both the heating zone valves/pumps thereby enabling boiler energy to be used for hot water; when the close-on-rise thermostat (250) senses a drop in temperature when hot water is not in demand the close-on-rise thermostat (250) opens and the generally-purpose relay coils (210, 220) de-energize allowing the normally closed contact relays (310, 320) to close and power to resume to the heating zone valves/pumps.

5. The system (100) of claim 1 further comprising an indicator light (280) disposed on the housing (110), the indicator light (280) is operatively connected to a normally open contact relay (340) disposed in the housing (110), wherein when the coil (210) is energized the coil (210) sends a second signal to the normally open contact relay (340), supplying power for the indicator light (280) and when the coil (210) is de-energized power stops to the indicator light (280).

* * * * *